(12) United States Patent
Ogura

(10) Patent No.: US 9,877,225 B2
(45) Date of Patent: Jan. 23, 2018

(54) COMMUNICATION DEVICE AND TRAFFIC CONTROL METHOD

(71) Applicant: NEC Corporation, Tokyo (JP)

(72) Inventor: Daisuke Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/122,525

(22) PCT Filed: Feb. 27, 2015

(86) PCT No.: PCT/JP2015/001044
§ 371 (c)(1),
(2) Date: Aug. 30, 2016

(87) PCT Pub. No.: WO2015/136875
PCT Pub. Date: Sep. 17, 2015

(65) Prior Publication Data
US 2017/0070908 A1    Mar. 9, 2017

(30) Foreign Application Priority Data
Mar. 14, 2014  (JP) .................. 2014-052349

(51) Int. Cl.
*H04W 28/02* (2009.01)
*H04L 12/46* (2006.01)
(Continued)

(52) U.S. Cl.
CPC ..... *H04W 28/0268* (2013.01); *H04L 12/4641* (2013.01); *H04W 72/085* (2013.01); *H04W 84/042* (2013.01); *H04W 88/16* (2013.01)

(58) Field of Classification Search
CPC .......... H04L 12/4641; H04W 28/0268; H04W 72/085; H04W 88/16; H04W 84/042
See application file for complete search history.

(56) References Cited

U.S. PATENT DOCUMENTS 9,660,830 B2 * 5/2017 Hyoudou ................ H04L 12/54
9,742,881 B2 * 8/2017 Chanda ................... H04L 69/22
(Continued)

FOREIGN PATENT DOCUMENTS

JP    2009-021916 A    1/2009
JP    2013-162418 A    8/2013
(Continued)

OTHER PUBLICATIONS

International Search Reporting corresponding to PCT/JP2015/001044, dated May 26, 2015, 2 pages.
(Continued)

*Primary Examiner* — Khaled Kassim
*Assistant Examiner* — Syed S Ali
(74) *Attorney, Agent, or Firm* — Wilmer Cutler Pickering Hale & Dorr

(57) ABSTRACT

In order to accommodate expansion of a mobile network and detailed QoS control, a transmission VXLAN header is generated by setting a logical group to which an input packet belongs as a logical network number in the VNI field of a VXLAN header and setting QoS information as traffic control information in a predefined, predetermined field. The generated transmission VXLAN header is added to the input packet, which is then output as a VXLAN header-added output packet to a mobile backhaul. When a VXLAN header-added input packet is input from the mobile backhaul, the received VXLAN header that was added is removed, and the logical network number that is set in the VNI field of the received VXLAN header and the traffic control information that is set in the predefined, predetermined field are extracted. Traffic control is performed on the basis of the extracted logical network number and traffic control information, and the packet is output as an output packet.

9 Claims, 12 Drawing Sheets

(51) Int. Cl.
*H04W 72/08* (2009.01)
*H04W 84/04* (2009.01)
*H04W 88/16* (2009.01)

(56) References Cited

U.S. PATENT DOCUMENTS

| | | | |
|---|---|---|---|
| 2005/0141548 A1* | 6/2005 | Koo | H04W 72/1242 370/462 |
| 2006/0067335 A1* | 3/2006 | Maya | H04L 12/4641 370/397 |
| 2010/0050051 A1* | 2/2010 | Song | H04L 1/0041 714/762 |
| 2012/0155298 A1 | 6/2012 | Yang et al. | |
| 2013/0266015 A1 | 10/2013 | Qu et al. | |
| 2013/0266019 A1 | 10/2013 | Qu et al. | |
| 2014/0016501 A1 | 1/2014 | Kamath et al. | |
| 2014/0071983 A1 | 3/2014 | Banavalikar et al. | |
| 2014/0071990 A1 | 3/2014 | Banavalikar et al. | |
| 2014/0348162 A1 | 11/2014 | Banavalikar et al. | |
| 2015/0180773 A1* | 6/2015 | DeCusatis | H04L 12/4641 370/392 |
| 2015/0200847 A1* | 7/2015 | Gourlay | H04L 49/70 370/392 |
| 2015/0295819 A1 | 10/2015 | Kamath et al. | |
| 2015/0381488 A1* | 12/2015 | Chanda | H04L 49/354 370/392 |
| 2016/0087885 A1* | 3/2016 | Tripathi | H04W 76/022 370/389 |
| 2016/0248702 A1 | 8/2016 | Banavalikar et al. | |

FOREIGN PATENT DOCUMENTS

| | | |
|---|---|---|
| JP | 2013-225834 A | 10/2013 |
| WO | WO-2016/018410 A1 | 2/2016 |

OTHER PUBLICATIONS

Written Opinion of the International Search Authority corresponding to PCT/JP2015/001044, dated May 26, 2015, 7 pages.

Behcet Sarikaya et al., "Quality of Service Marking in Virtual eXtensible Local Area Network," Internet-Draft, Version 00, IETF Network Working Group, Feb. 10, 2014, 10 pages.

Extended European Search Report issued by the European Patent Office for European Application No. 15760902.5 dated Jul. 21, 2017 (9 pages).

Japanese Office Action issued by the Japan Patent Office for the Japanese Application No. 2016-507336 dated Jul. 25, 2017 (5 pages).

* cited by examiner

EXAMPLE OF ALLOCATING SERVICE/PRIORITY INFORMATION TO ANOTHER RESERVED FIELD OF VXLAN HEADER

Fig. 9

EXAMPLE OF ALLOCATING SERVICE/PRIORITY INFORMATION TO VNI FIELD OF VXLAN HEADER

| FLAG | VXLAN NETWORK IDENTIFIER (VNI) (24 BITS) | RESERVED (8 BITS) |
|---|---|---|
| | RESERVED (24 BITS) | |

| CLASS OF SERVICE | VXLAN NETWORK IDENTIFIER (VNI) (21 BITS) |
|---|---|

| QCI | VXLAN NETWORK IDENTIFIER (VNI) (16 BITS) |
|---|---|

| Service Class Indicator | VXLAN NETWORK IDENTIFIER (VNI) (16 BITS) |
|---|---|

COMMUNICATION DEVICE AND TRAFFIC CONTROL METHOD

CROSS-REFERENCE TO RELATED APPLICATIONS

This application is a national stage application of International Application No. PCT/JP2015/001044 entitled "COMMUNICATION DEVICE AND TRAFFIC CONTROL METHOD," filed on Feb. 27, 2015, which claims the benefit of the priority of Japanese Patent Application No. 2014-052349 filed on Mar. 14, 2014, the disclosures of each of which are hereby incorporated by reference in their entirety.

TECHNICAL FIELD

The present disclosure relates to a communication device and a traffic control method.

BACKGROUND ART

With Long-Term Evolution (LTE) becoming more commonly used, data services are increasingly enlarging their capacities in mobile networks. Particularly, with the rapid prevalence of smartphones, data traffics of various real-time multi-media services, such as web browsing, video streaming, on-line gaming, and real-time video communicating, are explosively increasing.

For such services, superior Quality of Service (QoS) is desired so as to provide highly reliable and high quality audio, video, and data services. In addition, priority control in smaller units, such as the units of service classes and specific users, is also required.

Methods of controlling packet priority in a path from a wireless base station to a core network device in a mobile network include methods of using Type of Service (ToS), DiffServ Code Point (DSCP), and Class of Service (CoS).

ToS enables setting of eight-level priority using 3 bits of a ToS field in the Internet Protocol (IP) header. DSCP enables setting of 64-level priority using 6 bits by redefining the same ToS field in the IP header as a DS field. Further, CoS enables setting of eight-level priority using 3 bits of the priority field of a VLAN tag in a VLAN (Virtual Local Area Network) of IEEE (The Institute of Electrical and Electronics Engineers, Inc.) 802.1Q.

Mobile networks use VLANs or the like for isolating networks. In VLANs, each VLAN is identified by a VLAN-ID as an identifier of the VLAN. The VLAN-ID identifies up to the maximum of 4,095 VLANs using 12 bits in a VLAN tag.

PTL 1 discloses base stations that can assure the quality of Voice over Internet Protocol (VoIP) in a mobile network and a router that integrally controls the base stations.

According to the technique disclosed in PTL 1, a base station and a router are connected by a multi-link group that transfers VoIP packets and a multi-link group that transfers data packets other than VoIP. Then, the base station and the router isolate a transmission line by referring to the Type of Service (ToS) region of a received packet and transmit only a VoIP packet through the dedicated line. In this way, VoIP quality can be assured in the mobile network by preventing transmission delay of VoIP packets even when a large volume of data packets are received.

Further, PTL 2 discloses a technique of relieving the shortage of VLAN-IDs in a large scale data center.

The technique disclosed in PTL 2 is a technique that relieves the shortage of VLAN-IDs in a cloud system where a plurality of cloud bases are linked by connecting with one another via Virtual Private Networks (VPNs).

According to PTL 2, each cloud base has a virtual machine, a transfer device, and a gateway device. The transfer device transfers packets using identification information of an OpenFlow technique, instead of VLAN-IDs that identify VLANs allocated for respective tenants. The gateway device transmits/receives packets to/from the VPN terminal device using VLAN-IDs and transmits/receives packets to/from the transfer device using the above-described other identification information. In this way, packet transmission and reception using VLAN-IDs and packet transmission and reception without using VLAN-IDs can be isolated, which localizes the range where VLAN-IDs are uniquely allocated and relieves the shortage of VLAN-IDs.

CITATION LIST

Patent Literature

PTL 1: Japanese Laid-open Patent Publication No. 2009-021916
PTL 2: Japanese Laid-open Patent Publication No. 2013-162418

SUMMARY OF INVENTION

Technical Problem

As described above, innovative evolution of a mobile backhaul in mobile networks is desired to accommodate increase in data traffics, network expansion, and detailed QoS control.

For example, in LTE, an Evolved Packet Core (EPC) manages a vast amount of evolved Node Bs (eNodeBs). As such, even if VLANs are used to isolate a network, a network cannot be easily expanded due to the use count limitation of VLANs as described above.

Further, upon carrying out Radio Access Network (RAN) Sharing where a plurality of operators share the same wireless base stations, setting VLANs for respective operator networks and adjusting the settings in consideration of the limitations in allocation of VLAN-IDs to avoid overlapping takes time and labor.

In PTL 1, priorities are allocated in the ToS field included in an IP header. This ToS field contains 3 bits. Thus, priorities can be set at the maximum of eight levels. As such, PTL 1 can hardly accommodate services that require highly reliable, high quality and detailed QoS control.

In PTL 2, a cloud system includes a cloud based network and a wide area network. The cloud based network uses a technique other than conventional VLAN, such as Open Flow. On the other hand, the wide area network uses VLAN. PTL 2 discloses that localizing the range of allocating VLAN-IDs relieves the shortage of VLAN-IDs. However, PTL 2 can hardly accommodate priority control in small units, such as the units of service classes and specific users.

An exemplary embodiment of the present invention is to provide a communication device and a traffic control method that can better accommodate services that require highly reliable, high quality, detailed QoS control, and the like.

Solution to Problem

The communication device according to an exemplary embodiment includes: logical group/QoS identification means that receives an input packet and identifies a logical group to which the input packet belongs and Quality of Service (QoS) information including a priority class to be applied to the input packet; VXLAN header adding means that generates a transmission VXLAN header by setting a logical network number corresponding to the logical group in a VXLAN Network Identifier (VNI) field of a Virtual eXtensible Local Area network (VXLAN) header and setting traffic control information that includes priority control corresponding to the QoS information in a predefined, predetermined field of the VXLAN header based on the logical group and QoS information identified by the logical group/QoS identification means, adds the transmission VXLAN header to the input packet and outputs the packet as a VXLAN header-added output packet to a mobile backhaul; VXLAN header removal means that, upon receiving a VXLAN header-added input packet from the mobile backhaul, removes the received VXLAN header that was added to the VXLAN header-added input packet and extracts the logical network number that is set in the VNI field of the received VXLAN header and the traffic control information that is set in the predefined, predetermined field; traffic control means that performs traffic control including priority control and route isolation for the packet, from which the received VXLAN header was removed by the VXLAN header removal means, based on the logical network number and traffic control information extracted by the VXLAN header removal means and outputs the packet as an output packet.

Further, the traffic control method according to another exemplary embodiment includes: receiving an input packet and identifying a logical group to which the input packet belongs and Quality of Service (QoS) information including a priority class to be applied to the input packet; generating a transmission VXLAN header by setting a logical network number corresponding to the logical group in a VXLAN Network Identifier (VNI) field of a Virtual eXtensible Local Area network (VXLAN) header and setting traffic control information that includes priority control corresponding to the QoS information in a predefined, predetermined field of the VXLAN header; adding the transmission VXLAN header to the input packet and outputting the packet as a VXLAN header-added output packet to a mobile backhaul; when a VXLAN header-added input packet is input from the mobile backhaul, removing the received VXLAN header that was added to the VXLAN header-added input packet; extracting the logical network number that is set in the VNI field of the received VXLAN header and the traffic control information that is set in the predefined, predetermined field; and performing traffic control including priority control and route isolation for the packet, from which the received VXLAN header was removed, based on the extracted logical network number and traffic control information and outputting the packet as an output packet.

Advantageous Effects of Invention

An exemplary embodiment of the present invention can easily accommodate expansion of a mobile network and accommodate highly reliable, high quality, and detailed QoS control that is required for real-time multi-media services.

BRIEF DESCRIPTION OF DRAWINGS

FIG. 9 is a format view illustrating an example of allocating service/priority information to the VNI field of a VXLAN header;

DESCRIPTION OF EMBODIMENTS

<Preface>

To start with, the technique relating to an exemplary embodiment will be described. A large scale data center, which has introduced server virtualization, may require more logical networks than the number of logical networks made possible by the use of VLANs. To address this matter, the Inventor arrived at utilizing a Virtual eXtensible Local Area Network (VXLAN) protocol, which is under discussion at the drafting stage in the Internet Engineering Task Force (IETF). VXLAN encapsulates transmission data in an 8-byte VXLAN header and transmits the data as a User Datagram Protocol (UDP) packet. The VXLAN header defines VXLAN Network Identifier (VNI) of 24 bits. Using this VNI as VXLAN-ID for identification of a logical network, the number of identifiable logical networks can be increased up to approximately 16,770,000.

Accordingly, the Inventor arrived at solving the limitation of the number of VLAN settings by applying VXLAN to mobile networks and isolating the networks in VNI units.

Further, the Inventor found that services and priory could not be taken into consideration when VXLAN is used in mobile networks in the current VXLAN standard. In other words, although VXLAN can be applied to mobile networks to isolate networks in VNI units, detailed priority control and quality control may not be performed based on communication paths of smaller units. Therefore, the Inventor provides a mechanism as will be described in the following exemplary embodiments.

<First Exemplary Embodiment>

Figure 1:
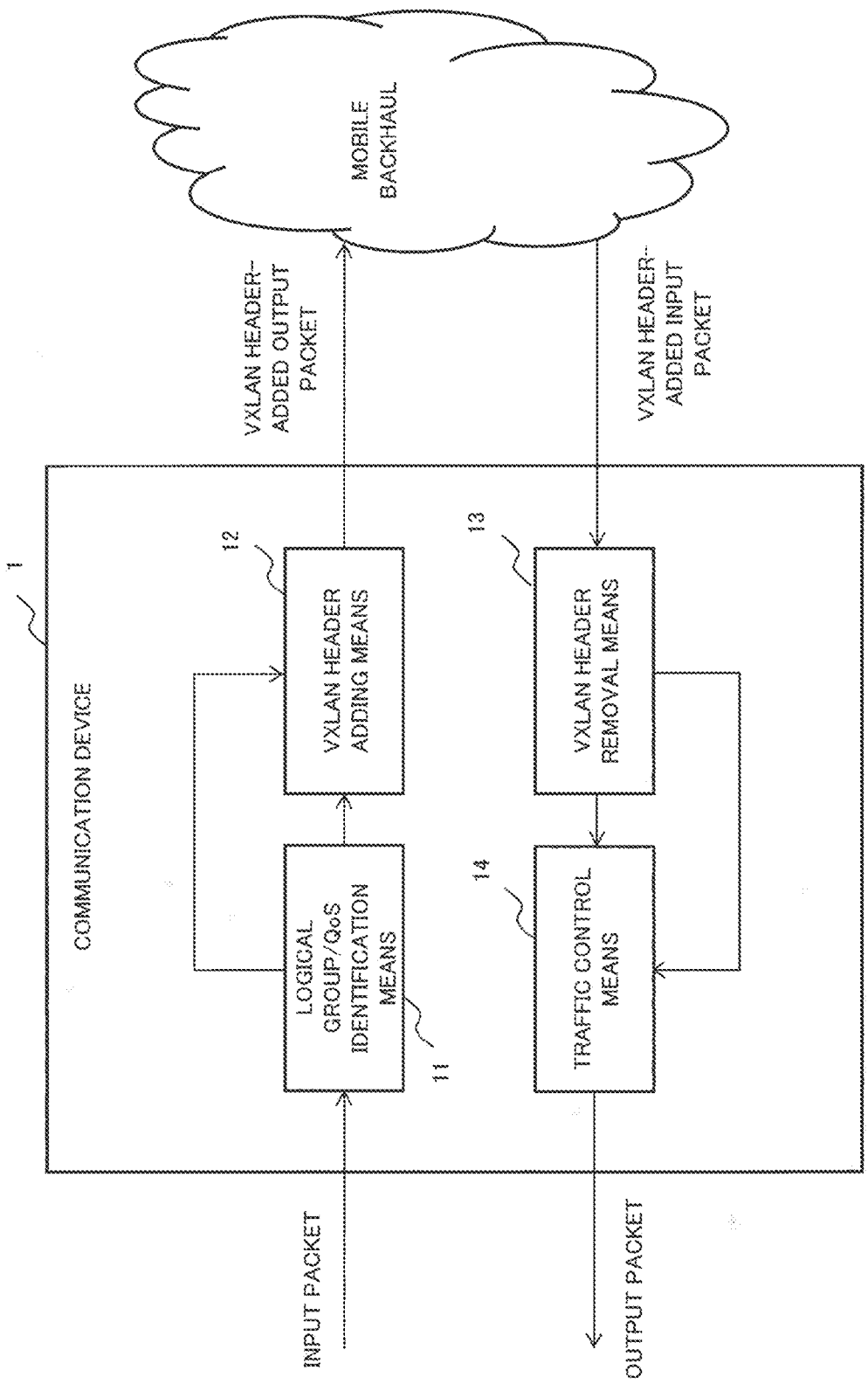
FIG. 1 is a block view illustrating a configuration of a communication device of a first exemplary embodiment.

FIG. 1 is a block view illustrating a configuration of a communication device of a first exemplary embodiment.

It should be noted that the exemplary embodiments are only an example, thus, the disclosed devices and systems are not limited to the configurations of the following exemplary embodiments.

The communication device 1 of the first exemplary embodiment includes logical group/QoS identification means 11, VXLAN header adding means 12, VXLAN header removal means 13, and traffic control means 14.

The logical group/QoS identification means 11 receives an input packet and identifies a logical group, to which the input packet belongs, and QoS (Quality of Service) information including a priority class.

The VXLAN header adding means 12 generates a transmission VXLAN header by setting information based on the logical group and QoS information identified by the logical group/QoS identification means 11 in the Virtual eXtensible Local Area network (VXLAN) header. The VXLAN header adding means 12 sets a logical network number corresponding to the logical group in the VXLAN Network Identifier (VNI) field and sets traffic control information including priority control corresponding to the QoS information in a predefined, predetermined field of the VXLAN header. Then, the VXLAN header adding means 12 adds the generated transmission VXLAN header to the input packet and outputs the packet as a VXLAN header-added output packet to a mobile backhaul.

When a VXLAN header-added input packet is input from the mobile backhaul, the VXLAN header removal means 13 removes the received VXLAN header that was added to the VXLAN header-added input packet. The VXLAN header removal means 13 extracts the logical network number that is set in the VNI field of the received VXLAN header and the traffic control information that is set in the predefined, predetermined field.

The traffic control means 14 performs traffic control including priority control and route isolation for the packet, from which the received VXLAN header was removed, based on the logical network number and traffic control information extracted by the VXLAN header removal means 13 and outputs the packet as an output packet.

Next, the operation of the communication device 1 according to the first exemplary embodiment will be described.

Figure 2:
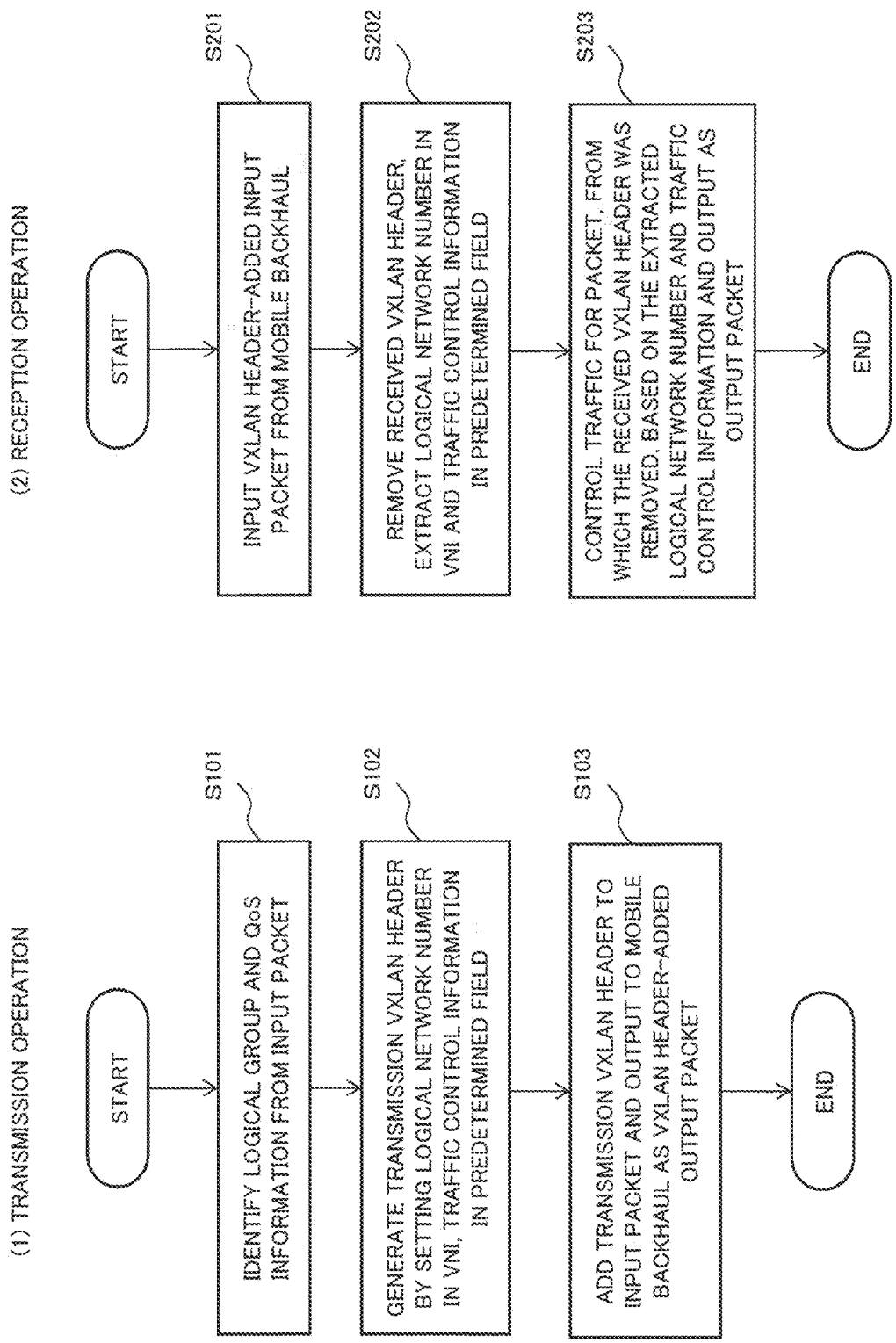
FIGS. 2-(1) and 2-(2) are flowcharts illustrating operations of the communication device of the first exemplary embodiment.

FIGS. 2-(1) and 2-(2) are flowcharts illustrating operations of the communication device 1 of the first exemplary embodiment.

It should be noted that, in the first exemplary embodiment, the traffic control method is implemented in the operation of the communication device 1. Accordingly, the following operation description of the communication device 1 can substitute the description of the traffic control method of the first exemplary embodiment.

FIG. 2-(1) is an operation when the communication device 1 transmits a packet to a mobile backhaul. FIG. 2-(2) is an operation when the communication device 1 receives a packet from the mobile backhaul.

The operation of the communication device 1 when transmitting a packet to the mobile backhaul is as follows:

First, upon receiving an input packet, the communication device 1 identifies a logical group to which the input packet belongs and Quality of Service (QoS) information including a priority class to be applied to the input packet (S101).

Next, the communication device 1 generates a transmission VXLAN header by setting a logical network number corresponding to the logical group and traffic control information including priority control corresponding to the QoS information in the Virtual eXtensible Local Area network (VXLAN) header (S102). It should be noted that the communication device 1 sets the logical network number in the VXLAN Network Identifier (VNI) field and the traffic control information in a predefined, predetermined field of the VXLAN header.

Then, the communication device 1 adds the transmission VXLAN header to the input packet and outputs the packet as a VXLAN header-added output packet to the mobile backhaul (S103).

On the other hand, the operation of the communication device 1 when receiving a packet from the mobile backhaul is as follows:

First, a VXLAN header-added input packet is input from the mobile backhaul (S201).

Next, the communication device 1 removes the received VXLAN header that was added to the VXLAN header-added input packet. Then, the communication device 1 extracts a logical network number that is set in the VNI field of the received VXLAN header and traffic control information that is set in the predefined, predetermined field of the received VXLAN header (S202).

The communication device 1 performs traffic control including priority control and route isolation for the packet, from which the received VXLAN header was removed, based on the extracted logical network number and traffic control information and outputs the packet as an output packet (S203).

As such, in the first exemplary embodiment, a logical network number is set in the VNI field that reserves 24 bits of the VXLAN header, enabling to isolate networks in VNI units and easily accommodate expansion of a mobile network. Although information necessary for traffic control is not defined in the current VXLAN standard, detailed priority control and quality control based on communication paths of smaller units are made possible by setting traffic control information in a predefined, predetermined field. Thus, the first exemplary embodiment can accommodate highly reliable, high quality, and detailed QoS control that is required for real-time multi-media services.

<Second Exemplary Embodiment>

Next, a second exemplary embodiment will be described.

Figure 3:
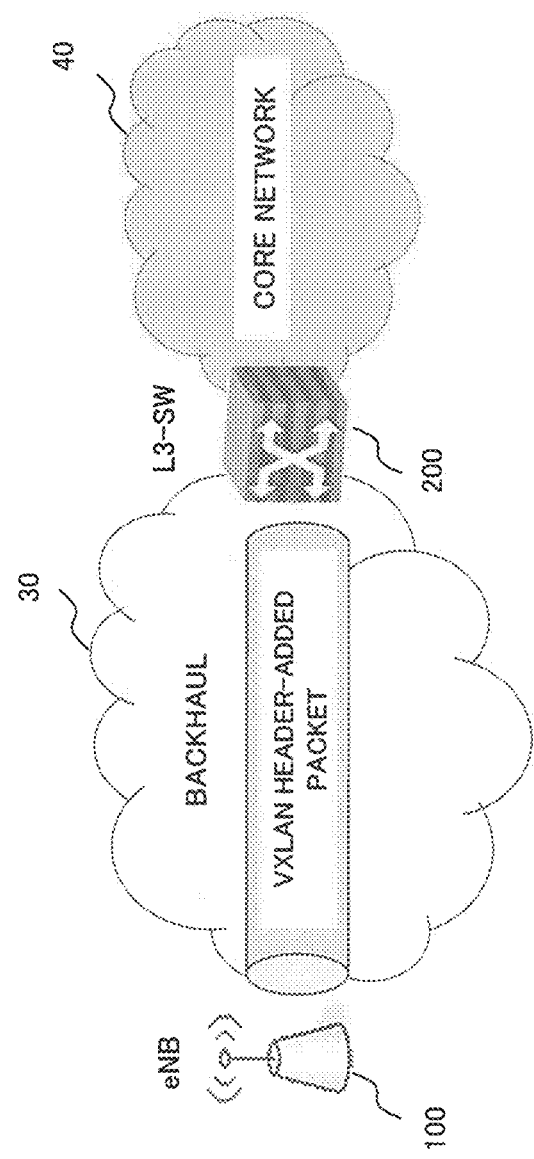
FIG. 3 is a conceptual view illustrating a backhaul and a core network of a mobile communication system as a background of a second exemplary embodiment.

FIG. 3 is a conceptual view illustrating a backhaul and a core network of a mobile communication system relating to the second exemplary embodiment. It should be noted that, in the following description, the backhaul refers to a mobile backhaul.

LTE is assumed as the mobile communication system relating to the second exemplary embodiment. A plurality of eNodeBs (eNBs) 100, which are wireless base stations that support wireless interfaces for mobile stations, not illustrated, are geographically scattered. The backhaul 30 is a network that accommodates such eNBs 100 and connects to the core network 40.

For simplicity of explanation, in the second exemplary embodiment, devices that constitute the core network and devices within the backhaul are collectively referred to as the L3-SW (layer 3 switch) 200. Then, the L3-SW 200 communicates with the eNBs 100 according to a predetermined protocol. The core network 40 is also referred to as the Evolved Packet Core (EPC).

As will be described later, in a communication between the eNB 100 and the L3-SW 200, packets, in which a VXLAN header is added to user data, are transmitted according to a predetermined protocol. The eNB 100 and L3-SW 200 have a function of processing VXLAN and realize traffic control according to the network isolation, service, and priority using the VNI field and predefined, predetermined field of the VXLAN header The communication device of the second exemplary embodiment refers to both the eNB 100 and L3-SW 200.

The VNI field of the VXLAN header is set with a logical network number by grouping in arbitrary units for connection, such as the units of networks, applications, service classes, charging classifications, users, and priority. This enables routing control for a logical group, in which the same VNI is applied from a wireless base station to a core network device. Then, by setting traffic control information based on QoS information in the predefined, predetermined field, a plurality of services and priority are taken into consideration within the same VNI, realizing traffic control in accordance with the services and priority in the backhaul.

Figure 4:
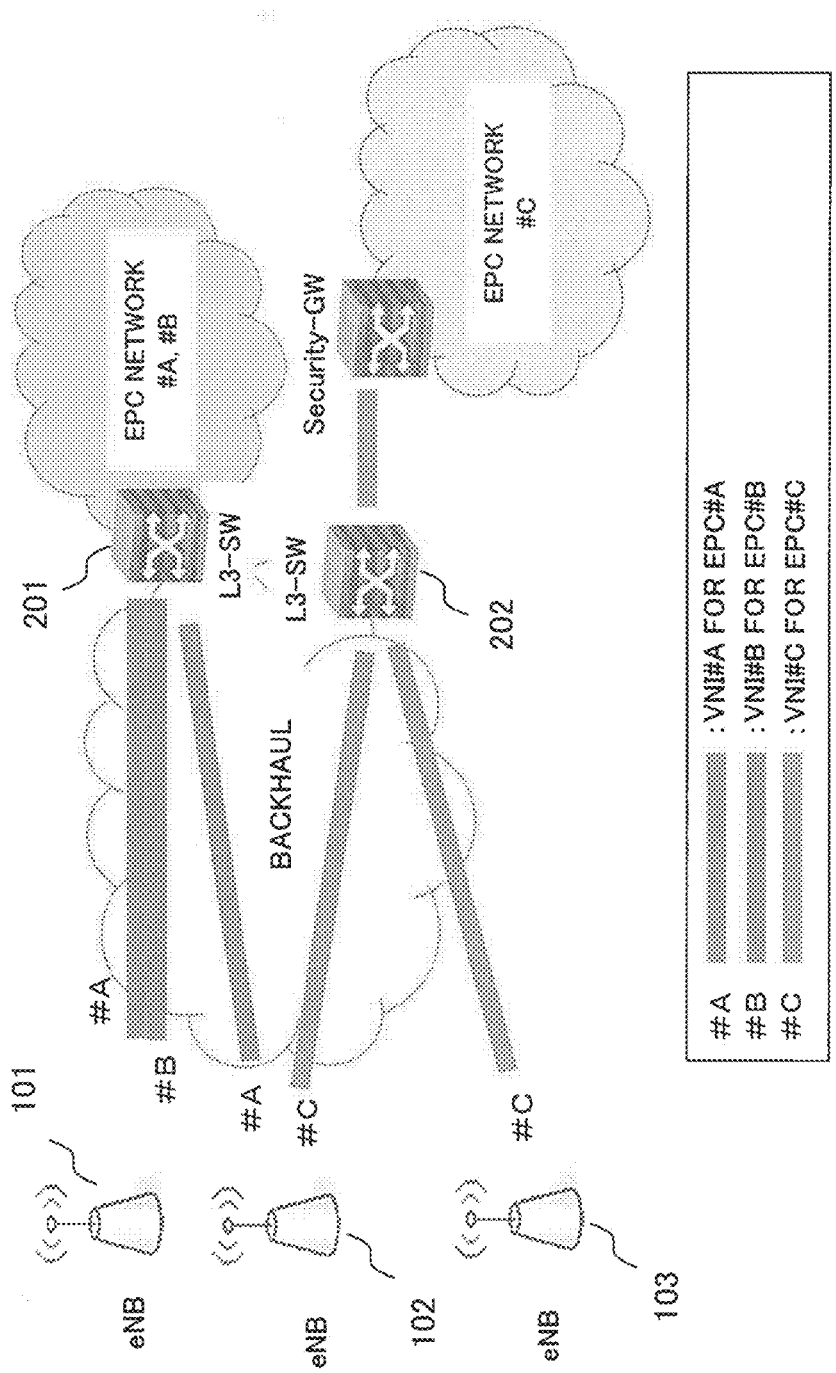
FIG. 4 is a conceptual view illustrating a connection example in a backhaul of a mobile communication system of the second exemplary embodiment.

FIG. 4 is a conceptual view illustrating a connection example in a backhaul of a mobile communication system of the second exemplary embodiment. FIG. 4 illustrates an example of setting the VNIs in the units of connection operators when RAN Sharing, in which a plurality of operators share wireless base stations, is adapted.

An eNB 101 handles calls for connecting to EPC networks #A and #B; an eNB 102 handles calls for connecting to EPC networks #A and #C; and an eNB 103 handles calls for connecting to an EPC network #C. Each EPC network corresponds to each connecting operator.

The eNBs 101 to 103 respectively set VNI#A for a call of a connection operator #A, VNI#B for a call of a connection operator #B, and VNI#C for a call of a connection operator #C in the VNI field to isolate networks.

Figure 5:
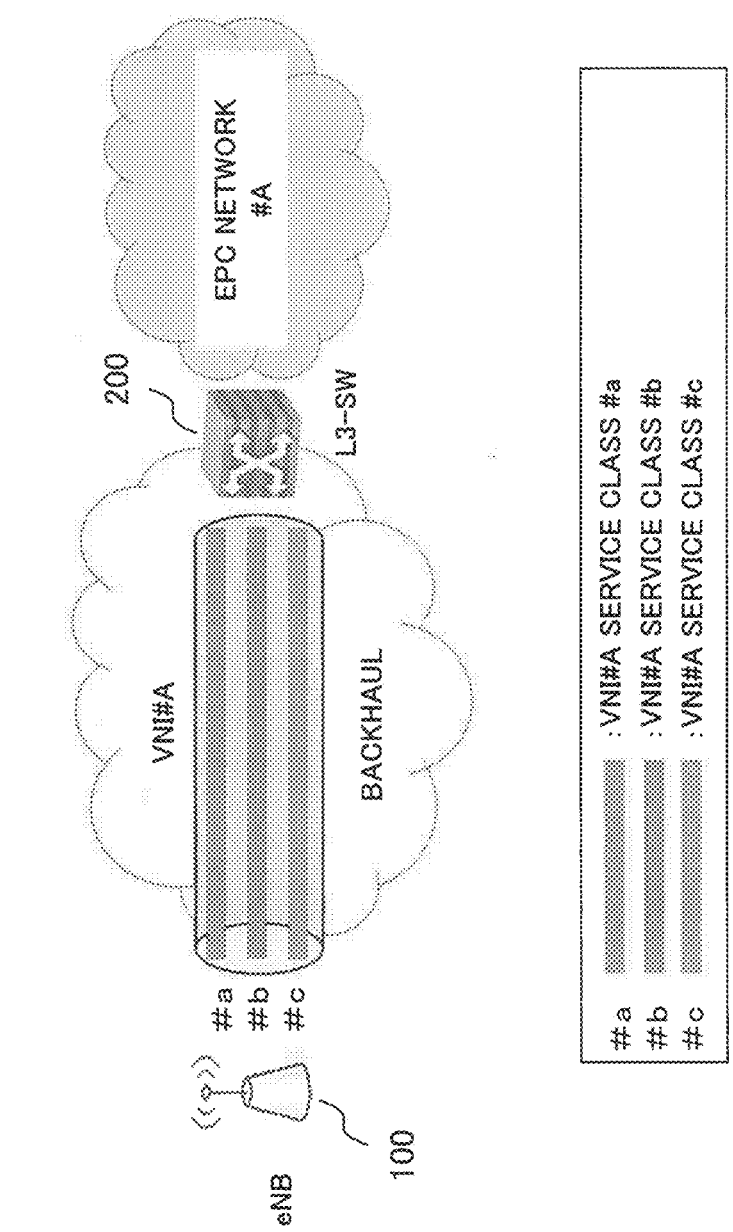
FIG. 5 is a conceptual view illustrating another connection example in a backhaul of a mobile communication system of the second exemplary embodiment.

FIG. 5 is a conceptual view illustrating another connection example in a backhaul of a mobile communication system of the second exemplary embodiment. FIG. 5 illustrates an example of setting a service class as traffic control information in the predefined, predetermined field of the VXLAN header so as to take into consideration of a plurality of services within the same VNI.

For a call of the connection operator #A, the eNB 100 sets information that can identify the service class of the call in the predefined, predetermined field. The L3-SW 200 performs traffic control corresponding to the set service class information. The traffic control corresponding to the service class information may be performed by the core network device that is upper than the L3-SW 200.

The VXLAN frame for performing the above-described control will be described.

Figure 6:
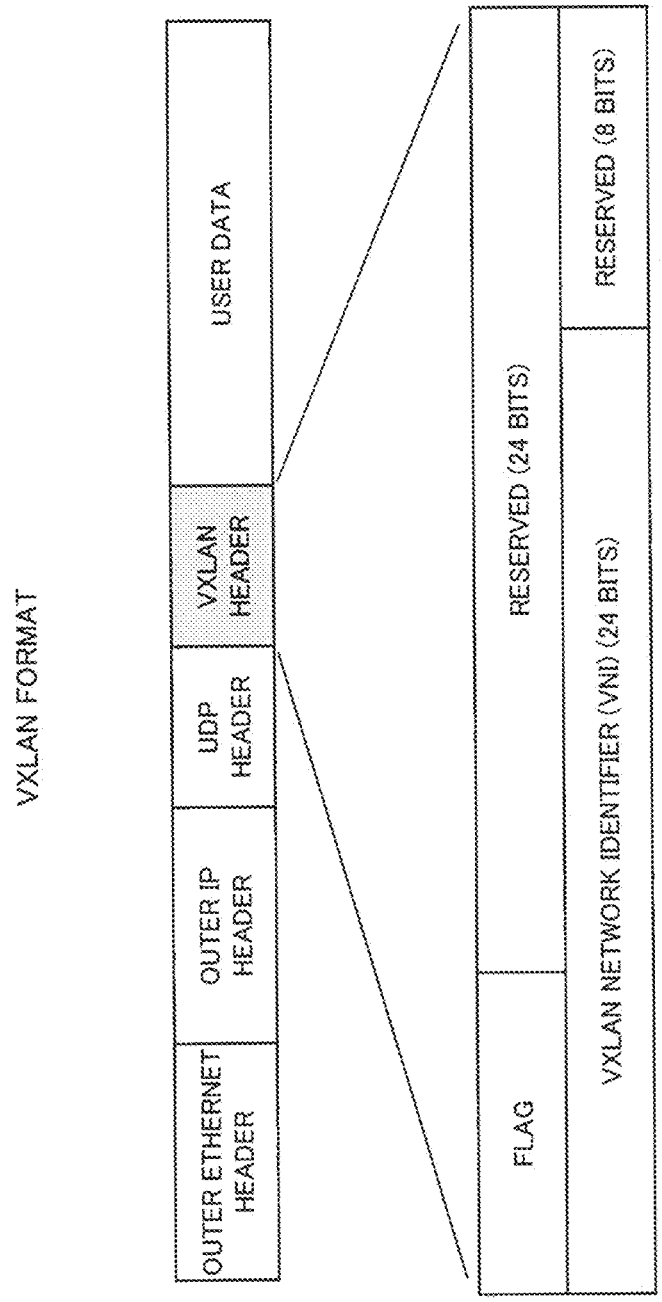
FIG. 6 is a format view illustrating a VXLAN frame.

FIG. 6 is a format view illustrating a VXLAN frame. This VXLAN format is the same as the current VXLAN standard that is under discussion at IETF. That is, user data is encapsulated in the VXLAN header of 8 bytes and transmitted as a UDP packet.

The VXLAN header includes an 8-bit flag segment, a 24-bit reserved field, a 24-bit VNI field, and an 8-bit reserved field. Then, the VNI field is set with a logical network number for isolating a network and a communication path according to an arbitrary condition.

Figure 7:
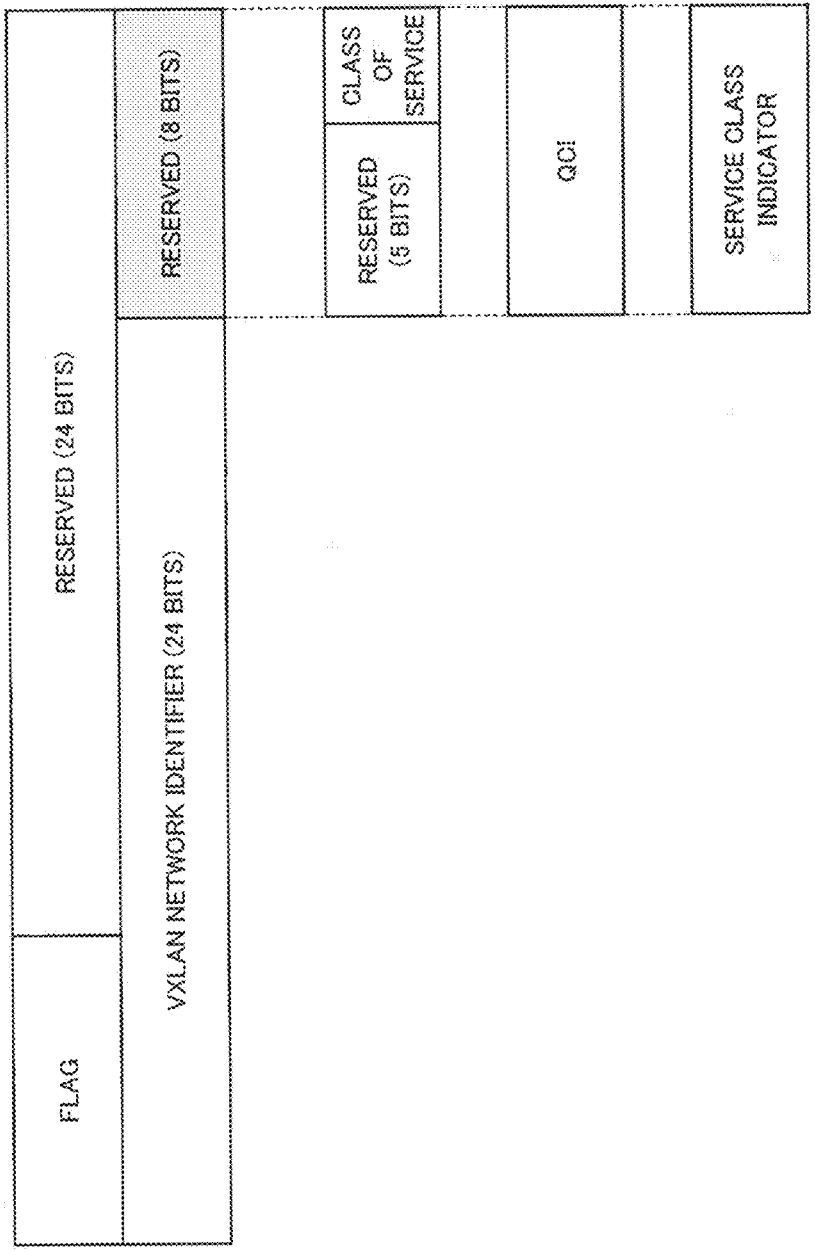
FIG. 7 is a format view illustrating an example of allocating service/priority information to a reserved field of a VXLAN header.
Figure 8:
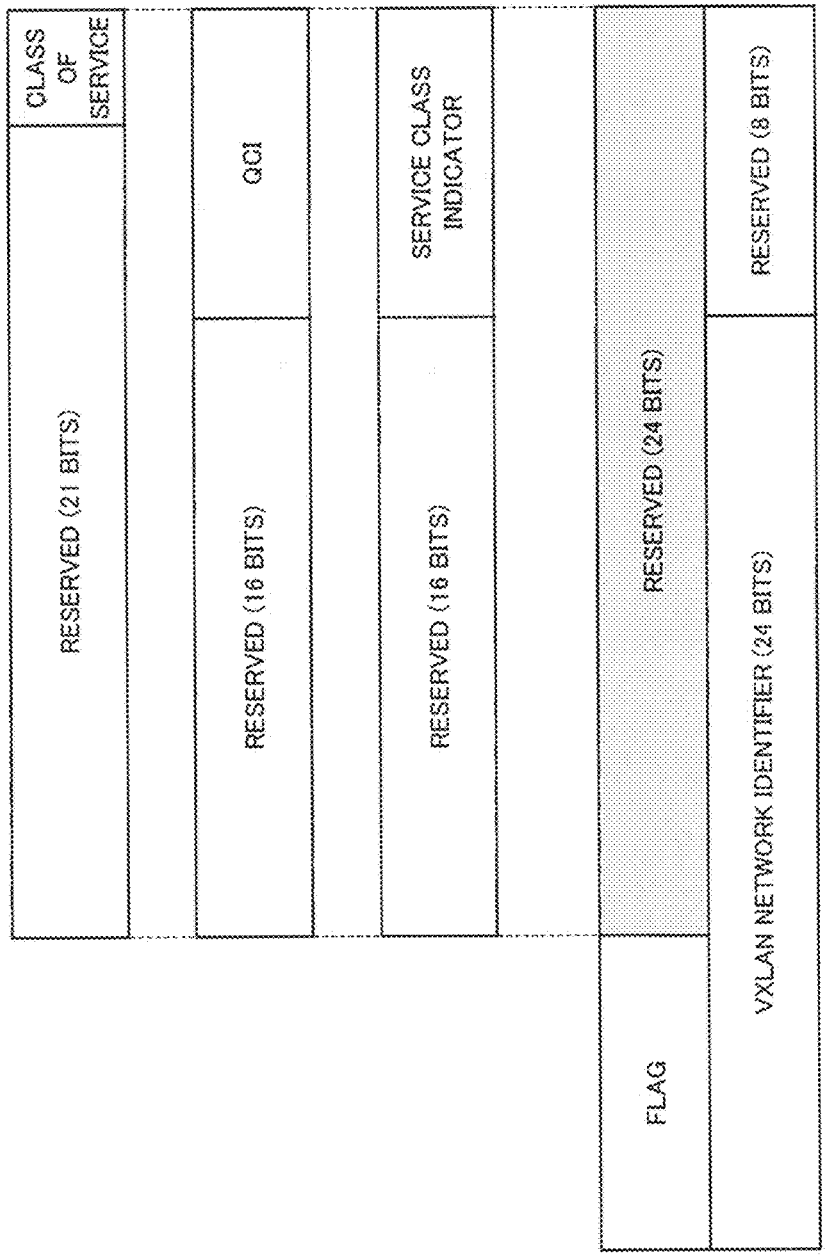
FIG. 8 is a format view illustrating an example of allocating service/priority information to another reserved field of a VXLAN header.

FIGS. 7 to 9 illustrate examples of setting priority information and service class information corresponding to QoS information as traffic control information in a predetermined field of a VXLAN header.

FIG. 7 is a format view illustrating an example of allocating traffic control information in a reserved field of a VXLAN header. FIG. 7 illustrates an example of setting priority information and service class information as traffic control information in the 8-bit reserved field following the VNI field. As an example, the information to be set includes a priority value (CoS) that is defined by IEEE 802.1p, QCI (QoS Class Identifier) that is defined by 3GPP (TS23.203, TS29.281), and Service Class Indicator.

FIG. 8 is a format view illustrating an example of allocating traffic control information in another reserved field of the VXLAN header. FIG. 8 illustrates an example of setting priority information and service class information in the 24-bit reserved field following the flag as traffic control information.

Further, FIG. 9 is a format view illustrating an example of allocating traffic control information in the VNI field of the VXLAN header. FIG. 9 illustrates an example of setting priority information and service class information as traffic control information in a portion of the 24-bit VNI field.

It should be noted that, although CoS, QCI, Service Class Indicator are exemplified as setting information, arbitrarily defined information that is used as traffic control information may be used as setting information without limitation.

The configuration and operation of the communication device of the second exemplary embodiment including the above-described function will be described.

Figure 10:
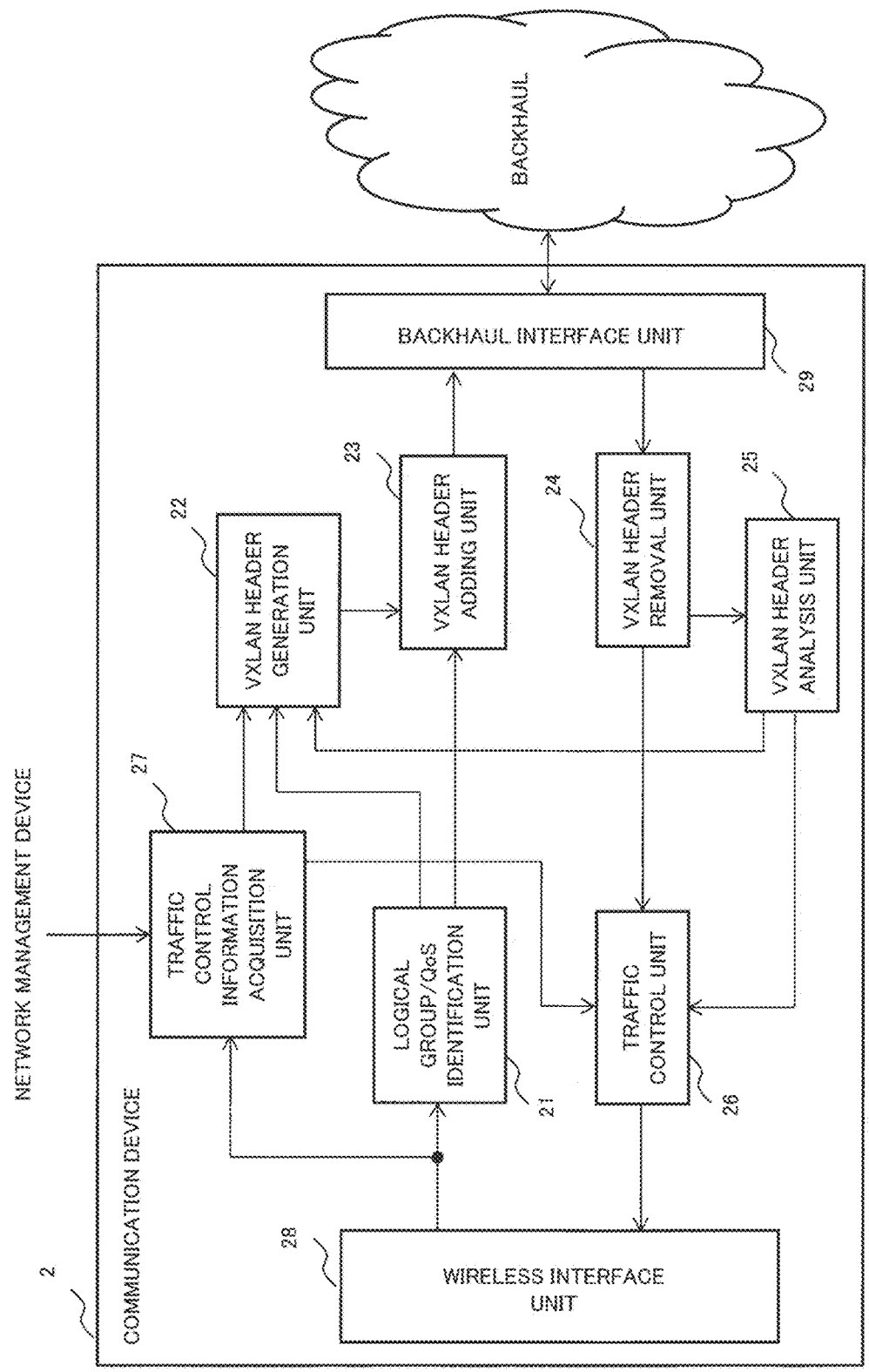
FIG. 10 is a block view illustrating a configuration of a communication device of the second exemplary embodiment.

FIG. 10 is a block view illustrating a configuration of a communication device 2 of the second exemplary embodiment. It should be noted that the communication device 2 of the second exemplary embodiment is both the eNB 100 and L3-SW 200 as illustrated in the conceptual view of FIG. 3. FIG. 10 is a block view illustrating a configuration when the communication device 2 is assumed as the eNB 100.

The communication device 2 includes a logical group/QoS identification unit 21, a VXLAN header generation unit 22, and a VXLAN header adding unit 23 as the configuration of the packet transmitting side to the backhaul. On the other hand, the communication device 2 includes a VXLAN header removal unit 24, a VXLAN header analysis unit 25, and a traffic control unit 26 as the configuration of the packet receiving side from the backhaul.

The logical group/QoS identification means 11 in the first exemplary embodiment is equivalent to the logical group/QoS identification unit 21, and the VXLAN header adding means 12 is equivalent to the VXLAN header generation unit 22 and the VXLAN header adding unit 23. Further, the VXLAN header removal means 13 in the first exemplary embodiment is equivalent to the VXLAN header removal unit 24 and the VXLAN header analysis unit 25, and the traffic control means 14 is equivalent to the traffic control unit 26.

Further, the communication device 2 includes a wireless interface unit 28, which supports a communication interface to communicate with mobile stations, and a backhaul interface unit 29 as a communication interface to communicate with the core network device via the backhaul.

In addition, the communication device 2 includes a traffic control information acquisition unit 27 that is located in a network and acquires information relating to traffic control from a network management device that integrally manages the network state.

The logical group/QoS identification unit 21 receives an input packet from a wireless interface 28 and identifies a logical group to which the input packet belongs and QoS information. Here, information to be set in the above-described VNI and predetermined field of the VXLAN header is identified and extracted.

The rule of assigning a setting value in a VNI and a predetermined field is specified in advance upon designing of the network. The logical group/QoS identification unit 21 identifies and extracts information that is specified in advance from the user identifier, Media Access Control (MAC) address, VLAN tag, IP address, IP header, and the like of the input packet.

The VXLAN header generation unit 22 generates a VXLAN header by setting values based on information notified from the logical group/QoS identification unit 21 in the VNI and the predetermined field according to the rule of assigning a setting value in a VNI and a predetermined field. As such, the VXLAN header generation unit 22 maintains in advance a correspondence relationship among the information identified and extracted by the logical group/QoS identification unit 21 and values to be set in the VNI and predetermined field. The VXLAN header generated by the VXLAN header generation unit 22 is also referred to as a transmission VXLAN header.

A value that groups from a wireless base station to a core network device as a unit for performing routing control of the same rule is set in the VNI as a logical network number. As an arbitrary unit may be used for this grouping, for example, the units of networks, applications, service classes, charging classes, users, priority, and any combinations thereof may be considered.

The predefined, predetermined field is set with priority information, service class information, and the like, which allows differentiated traffic control in a group where routing control is performed within the same VNI, as traffic control information. Although CoS, QCI, Service Class Indicator, and the like are used as priority information and service class information as described above, newly defined, arbitrary information may be used instead.

The VXLAN header adding unit 23 adds the transmission VXLAN header generated by the VXLAN header generation unit 22 to a packet to be transmitted and outputs the VXLAN header-added output packet to the backhaul interface unit 29.

The backhaul interface unit 29 supports, for example, S1-u interface, and communicates with the core network device that is connected via the backhaul according to a predetermined protocol and transmits/receives packets with the VXLAN header to/from the core network device.

The VXLAN header removal unit 24 removes the VXLAN header from the VXLAN header-added input packet received from the backhaul interface unit 29. Then, the VXLAN header removal unit 24 outputs the packet, from which the VXLAN header was removed, to the traffic control unit 26 and the removed VXLAN header to the VXLAN header analysis unit 25. The VXLAN header removed from the VXLAN header-added input packet is also referred to as the received VXLAN header.

The VXLAN header analysis unit 25 extracts a logical network number that is set in the VNI field of the received VXLAN header as the analysis subject and priority information and service class information that is set in the predefined, predetermined field. The VXLAN header analysis unit 25 outputs the extracted logical network number, priority information, service class information, and the like to the traffic control unit 26 as traffic control information according to the rule of assigning a setting value in a VNI and a predetermined field.

The traffic control unit 26 performs traffic control for the packet output by the VXLAN header removal unit 24 based on the traffic control information output by the VXLAN header analysis unit 25 and outputs the packet as an output packet to the wireless interface unit 28. The performed traffic control includes priority control, traffic shaping, and route isolation.

Further, the traffic control information acquisition unit 27 acquires information relating to the traffic control from the network management device which is not illustrated.

The network management device is a device that is located in a network and integrally manages the network state by connecting with devices within the network. Then, the network management device recognizes the use state of the VNI in accordance with the network traffic state and, based thereon, issues traffic control instructions to the devices. For example, to perform traffic control in VNI units, the network management device recognizes traffic amounts and paths in VNI units and issues traffic control instructions to the related devices.

It should be noted that the traffic control information acquisition unit 27 also has a function of recognizing the traffic state based on the packet processing amount of the communication device and generating traffic control information based on the traffic state. For example, the traffic control information acquisition unit 27 may control traffics by detecting congestion in arbitrary units so as to change the set VNI value and priority information in accordance with the congestion state.

As such, the traffic control information acquisition unit 27 outputs traffic control information that it acquired from the network management device or generated on its own to the VXLAN header generation unit 22 and the traffic control unit 26. It will be appreciated that the traffic control information acquisition unit 27 may acquire the traffic control information from the network management device as well as generate the traffic control information on its own.

The VXLAN header generation unit 22 changes the values to be set in the VNI and predetermined field of the VXLAN header based on the traffic control information received from the traffic control information acquisition unit 27. In this case, the VXLAN header generation unit 22 may set a value instructed as traffic control information as is. Alternatively, the VXLAN header generation unit 22 may change as necessary the information indicating a correspondence relationship between information notified by the logical group/QoS identification unit 21 and values set in the VNI and predetermined field, based on the value instructed as the traffic control information.

The traffic control unit 26 performs traffic control based on the traffic control information that was received from the traffic control information acquisition unit 27, instead of the traffic control information that was output by the VXLAN header analysis unit 25. Alternatively, the traffic control unit 26 may perform traffic control in consideration of both the traffic control information that was received from the traffic control information acquisition unit 27 and the traffic control information that was output by the VXLAN header analysis unit 25.

As such, traffic control in consideration of the entire network is enabled by generating a VXLAN header and controlling traffics in conjunction with the traffic control information acquisition unit 27.

Further, although the information to be set in a VXLAN header is identified by the input packet or acquired by the traffic control information acquisition unit 27 in the above description, the VNI and traffic control information may be notified from the core network side.

For example, dummy information may be set in the VXLAN header in the initial state, and the core network side may notify the information to be used upon recognizing and confirming the service content and the like. Alternatively, predetermined information corresponding to an application and a service may be set in advance and, when the application and service that the user uses change, the core network side may notify the information corresponding to the changed application and service.

To perform such a control, the core network device, not illustrated, transmits a packet by adding the update information to the VXLAN header.

For example, an update flag is added to a flag unit or a predefined arbitrary bit as information indicating that the notification of update information is included in the received VXLAN header. Then, a logical network number to be updated is set in the VNI field and traffic control information to be updated is set in the predefined, predetermined field, which are then notified.

Accordingly, the VXLAN header analysis unit 25 recognizes that the update notification is from the core network device when a predetermined update flag is added to the received VXLAN header. In such a case, the VXLAN header analysis unit 25 outputs the logical network number that is set in the VNI field and the traffic control information that is set in the predefined, predetermined field to the VXLAN header generation unit 22 as header update information.

Upon receiving the notification of header update information, the VXLAN header generation unit 22 updates the correspondence relationship between information notified by the logical group/QoS identification unit 21 and information to be set in the transmission VXLAN header based on the header update information.

The above is the configuration of the communication device 2 of the second exemplary embodiment.

It should be noted that, although the above description was made with an assumption that the communication device 2 was the eNB 100 in the conceptual view illustrated in FIG. 3, the communication device 2 may instead be the L3-SW 200. If the communication device 2 is the L3-SW 200, the communication device 2 is equipped with a core network interface unit in place of the wireless interface unit 28 illustrated in FIG. 10. The core network interface unit is a component that supports, for example, S5 interface and communicates with other core network devices within the core network in accordance with a predetermined protocol.

Next, with reference to FIGS. 11 and 12, the operation of the communication device 2 of the second exemplary embodiment will be described.

Figure 11:
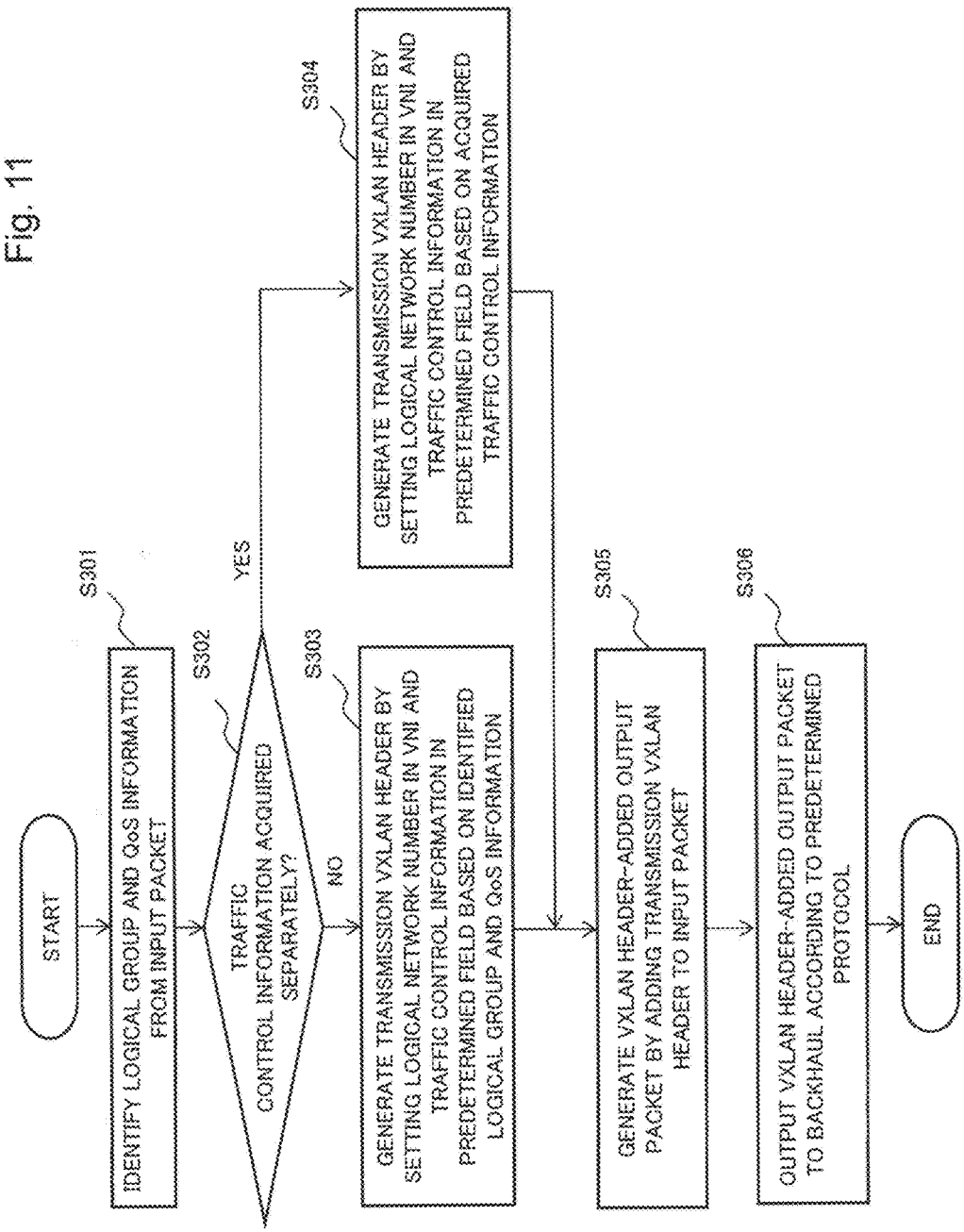
FIG. 11 is a flowchart illustrating an operation of the communication device of the second exemplary embodiment when a packet is transmitted to a backhaul.

FIG. 11 is a flowchart illustrating the operation of the communication device 2 of the second exemplary embodiment when the communication device 2 transmits a packet to a backhaul.

The communication device 2 receives an input packet from the wireless interface unit 28 and identifies the logical group to which the input packet belongs and QoS information (S301). Here, information to be set in the above-described VNI and predetermined field of the VXLAN header is identified and extracted.

At this point, the communication device 2 determines whether it has acquired traffic control information separately (S302). The traffic control information may be traffic control information that was acquired according to an instruction from the network management device or traffic control information that the communication device 2 acquired on its own.

If the communication device 2 has not acquired such traffic control information (S302, No), the communication device 2 generates a transmission VXLAN header based on the logical group and QoS information that were identified at step S301 (S303). The communication device 2 sets a logical network number in the VNI of the transmission VXLAN header and traffic control information in the predetermined field.

If the communication device 2 has acquired traffic control information (S302, Yes), the communication device 2 generates a transmission VXLAN header based on the acquired traffic control information (S304). It should be noted that, as described above, the communication device 2 may use the acquired traffic information as is or may change, as necessary, information indicating a correspondence relationship between the logical group and QoS information that were identified at step S301 and values to be set in the VNI and predetermined field.

Then, the communication device 2 adds the transmission VXLAN header to the input packet to generate a VXLAN header-added output packet (S305).

The communication device 2 outputs the VXLAN header-added output packet to the backhaul according to a predetermined protocol (S306).

Figure 12:
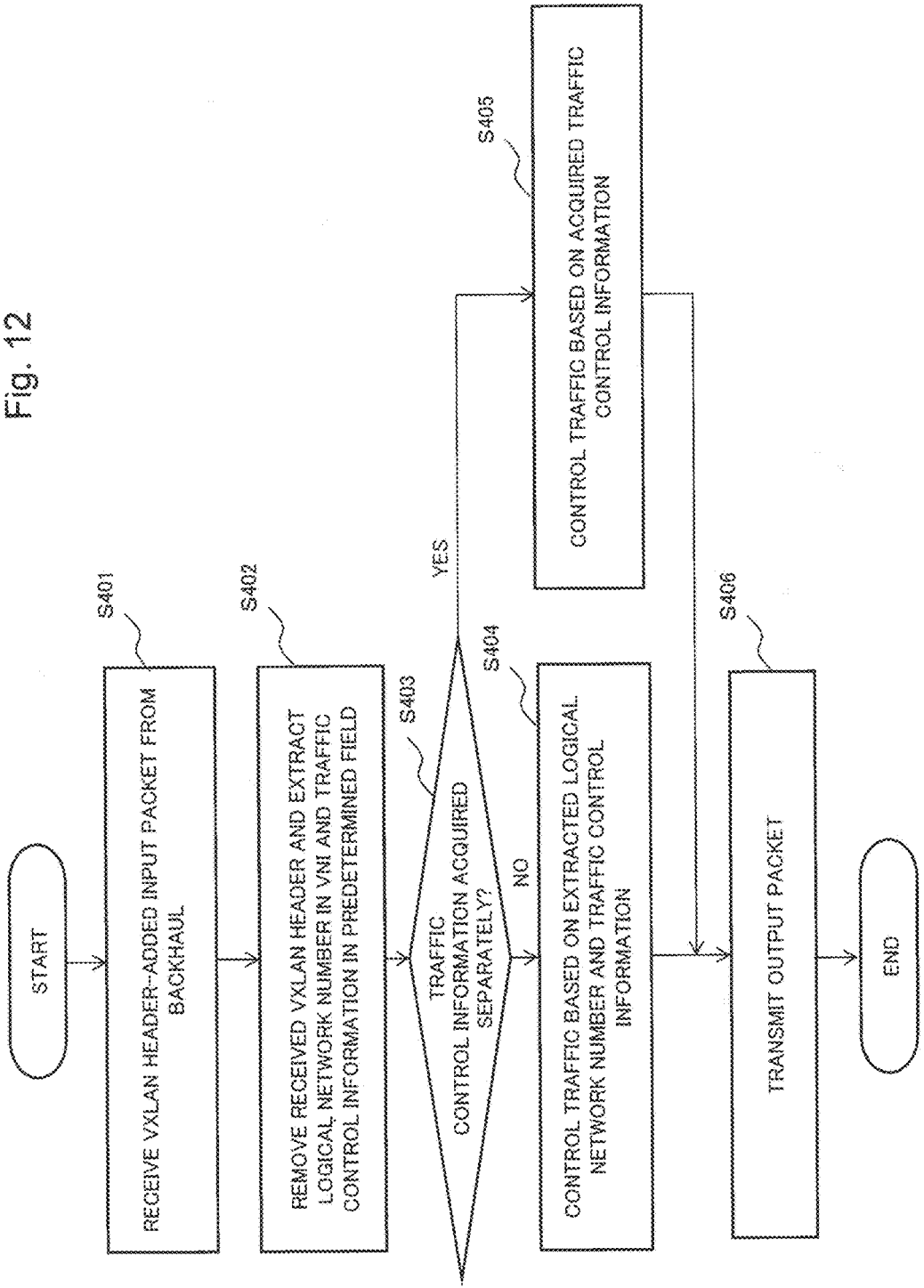
FIG. 12 is a flowchart illustrating an operation of the communication device of the second exemplary embodiment when a packet is received from a backhaul.

FIG. 12 is a flowchart illustrating an operation of the communication device 2 of the second exemplary embodiment when the communication device 2 receives a packet from the backhaul.

The communication device 2 receives a VXLAN header-added input packet from the backhaul (S401).

Next, the communication device 2 removes the received VXLAN header that was added to the VXLAN header-added input packet. Then, the communication device 2 extracts a logical network number that is set in the VNI field of the received VXLAN header and traffic control information that is set in the predefined, predetermined field (S402).

At this point, the communication device 2 determines whether it has acquired traffic control information separately (S403). The traffic control information may be traffic control information that was acquired according to an instruction from the network management device or traffic control information that the communication device 2 acquired on its own.

If the communication device 2 has not acquired such traffic control information (S403, No), the communication device 2 performs traffic control for the packet, from which the received VXLAN header was removed, based on the logical network number and priority control information that were extracted at step S402 (S404).

On the other hand, if the communication device 2 has acquired traffic control information (S403, Yes), the communication device 2 performs traffic control based on the acquired traffic control information (S405). Alternatively, the communication device 2 may perform traffic control in consideration of both the acquired traffic control information and the information extracted at step S402.

Then, the communication device 2 transmits the output packet (S406).

As described above, in the second exemplary embodiment, the communication device of a mobile network, including a function of supporting VXLAN, sets a logical network number in the VNI field and sets traffic control information in the predefined, predetermined field. As such, networks and communication paths can be isolated in the units of VNIs, for which 24 bits are reserved, easily accommodating expansion of a mobile network. Further, differences among traffics can be taken into consideration in the same VNI based on the traffic control information that is set in a predefined, predetermined field, enabling finely performing different traffic controls in the same VNI. As the result, the second exemplary embodiment can accommodate highly reliable, high quality, and detailed QoS control that is required for real-time multi-media services that are expected to increasingly expand.

Further, the above exemplary embodiments have been described as hardware components without limitation.

In the above-described examples, the program may be stored using various types of non-transitory computer readable mediums, which can be supplied to a computer. The non-transitory computer readable mediums include various types of tangible storage mediums. Examples of non-transitory computer readable mediums include magnetic recording mediums (e.g., flexible disks, magnetic tapes, hard disk drives), magneto optical recording mediums (e.g., Magneto-Optical disks), CD-ROM (Read Only Memory), CD-R, CD-R/W, and semiconductor memories (e.g., mask ROM, PROM (Programmable ROM), EPROM (Erasable PROM), flash ROM, and RAM (Random Access Memory)). Further, the program may be supplied to a computer through various types of transitory computer readable mediums. Examples of transitory computer readable mediums include electric signals, optical signals, and electromagnetic waves. The transitory computer readable mediums can supply the program to a computer via a wired channel, such as electric cables or optical fibers, or a wireless channel.

The claimed invention has been described so far with reference to the exemplary embodiments, without limitation thereto. A variety of modifications that will be understood by those skilled in the art can be made to the configuration and details of the claimed invention within the scope thereof.

This application claims priority based on Japanese Patent Application No. 2014-052349 filed on Mar. 14, 2014, which application is incorporated herein in its entirety by disclosure.

REFERENCE SIGNS LIST 1, 2 Communication device
11 Logical group/QoS identification means
12 VXLAN header adding means
13 VXLAN header removal means
14 Traffic control means
21 Logical group/QoS identification unit
22 VXLAN header generation unit
23 VXLAN header adding unit
24 VXLAN header removal unit
25 VXLAN header analysis unit
26 Traffic control unit
27 Traffic control information acquisition unit
28 Wireless interface unit
29 Backhaul interface unit
30 Backhaul
40 Core network
100, 101, 102, 103 eNB
200, 201, 202 L3-SW

The invention claimed is:

1. A communication device comprising:
at least one memory storing program instructions; and
at least one processor configured to execute the program instructions to:
receive an input packet and identify a logical group to which the input packet belongs and Quality of Service (QoS) information including a priority class to be applied to the input packet;
generate a transmission VXLAN header by setting a logical network number corresponding to the logical group in a VXLAN Network Identifier (VNI) field of a VXLAN header and by setting traffic control information that includes priority control corresponding to the QoS information in a predetermined field of the VXLAN header based on the logical group and QoS information identified by the logical group/QoS identification unit, add the transmission VXLAN header to the input packet, and output the packet as a VXLAN header-added output packet to a mobile backhaul;
upon receiving a VXLAN header-added input packet from the mobile backhaul, remove the received VXLAN header added to the VXLAN header-added input packet and extract the logical network number set in the VNI field of the received VXLAN header and the traffic control information set in the predetermined field; and
perform traffic control including priority control and route isolation for the packet, from which the received VXLAN header was removed, based on the logical network number and the extracted traffic control information, and output the packet as an output packet wherein, if a predetermined update flag is added to the received VXLAN header, the at least one processor is further configured to execute the program instructions to output the logical network number set in the VNI field of the received VXLAN header and the traffic control information set in the predetermined field as header update information, and upon receiving notification of the header update information, update a correspondence relationship between the logical group and the QoS information and the logical network number and the traffic control information set in the transmission VXLAN header, based on the received header update information.

2. The communication device according to claim 1, wherein the predetermined field of the VXLAN header comprises at least any one field of an 8-bit reserved field following the VNI field, a 24-bit reserved field following a flag, and a field that uses a portion of 24 bits that constitute the VNI field.

3. The communication device according to claim 1, wherein the at least one processor is further configured to execute the program instructions to acquire traffic control information based on a traffic state and output the traffic control information upon receiving notification of the traffic control information, generate the transmission VXLAN header based on the received traffic control information, and upon receiving notification of the traffic control information, perform the traffic control based on the received traffic control information.

4. The communication device according to claim 3, wherein the at least one processor is further configured to execute the program instructions to acquire the traffic control information from a network management device that integrally manages a network state and issue a traffic control instruction to each device according to the network traffic state.

5. The communication device according to claim 3, wherein the at least one processor is further configured to execute the program instructions to recognize a traffic state based on the packet processing amount of the communication device and generate traffic control information based on the traffic state.

6. A traffic control method comprising:
receiving an input packet and identifying a logical group to which the input packet belongs and Quality of Service (QoS) information including a priority class to be applied to the input packet; generating a transmission Virtual eXtensible Local Area network (VXLAN) header by setting a logical network number corresponding to the logical group in a VXLAN Network Identifier (VNI) field of a VXLAN header and setting traffic control information that includes priority control corresponding to the QoS information in a predetermined field of the VXLAN header; adding the transmission VXLAN header to the input packet and outputting the packet as a VXLAN header-added output packet to a mobile backhaul;

when a VXLAN header-added input packet is input from the mobile backhaul, removing the received VXLAN header added to the VXLAN header-added input packet; extracting the logical network number set in the VNI field of the received VXLAN header and the traffic control information set in the predetermined field;

performing traffic control including priority control and route isolation for the packet, from which the received VXLAN header was removed, based on the extracted logical network number and traffic control information and outputting the packet as an output packet; and if a predetermined update flag is added to the received VXLAN header, outputting the logical network number set in the VNI field of the received VXLAN header and the traffic control information set in the predetermined field as header update information, and updating a correspondence relationship between the logical group to which the input packet belongs and the QoS information including a priority class to be applied to the input packet and the logical network number and the traffic control information set in the transmission VXLAN header, based on the outputted header update information.

7. The traffic control method according to claim 6, further comprising:

acquiring traffic control information based on a traffic state; upon receiving the traffic control information, generating the transmission VXLAN header based on the acquired traffic control information; and upon receiving the traffic control information, performing the traffic control for the packet, from which the received VXLAN header was removed, based on the acquired traffic control information and outputting the packet as an output packet.

8. The traffic control method according to claim 7, wherein the traffic control information is acquired from a network management device that integrally manages a network state and issues a traffic control instruction to each device according to a network traffic state.

9. The traffic control method according to claim 7, wherein the traffic control information is information generated based on a traffic state that was recognized based on a packet processing amount of a communication device.

* * * * *